UNITED STATES PATENT OFFICE.

JULIUS SCHMIDLIN, OF BASEL, SWITZERLAND, AND WALTER BRUNNER, OF MAINKUR, NEAR FRANKFORT-ON-THE-MAIN, GERMANY.

VAT DYESTUFFS AND PROCESS OF MAKING SAME.

1,405.446.

Specification of Letters Patent.   Patented Feb. 7, 1922.

No Drawing.   Application filed September 5, 1921.   Serial No. 498,596½.

*To all whom it may concern:*

Be it known that we, JULIUS SCHMIDLIN, a subject of the Swiss Republic, residing at Basel, Alemannengasse 101, Switzerland, and WALTER BRUNNER, a subject of the Austrian Republic, residing at Mainkur, near Frankfort-on-the-Main, Germany, Langstrasse 41, have invented certain new and useful Improvements in Vat Dyestuffs and Processes of Making Same, of which the following is a full description.

We have found that valuable vat dyestuffs of very useful dark shades, having a great affinity for the animal fibre, are obtained by heating in aqueous or alcoholic solution with alkaline sulfides to advantage with ammonium sulfide (preferably under pressure) the m-nitroarylides of the halogenated benzoquinones. This observation is all the more surprising as benzoquinone-o-nitranilide is converted with ammonium sulfide into quinone-homofluorindine (Berichte 23, 2793) a substance, representing a dyestuff insoluble in alkali and hydrosulfite and thus not applicable as vat color.

As starting materials for the new process the products may be used which are obtained in the usual manner by condensation of the halogenated benzoquinones with a m-nitroarylamine as m-nitraniline or its substitution products, for instance chlor-m-nitraniline, m-nitrotoluidine, m-nitrophenetidine (the nitro group always being in m-position to the amino group). According to the nature of the nitroarylamine and likewise according to the alkaline sulfide used as sulfurizing agent, and according to the temperature and duration of the reaction the shades obtained vary from brown to greenish to blackish brown.

The new dyestuffs are dark powders insoluble in water and in most organic solvents. They show a characteristic coloration with sulfuric acid, yielding violet to blue to greenish blue shades. With alkaline hydrosulfite yellow to brownish yellow colored vats are obtained, from which wool is dyed in very fast shades.

Our process is illustrated by the following example:

Example: 10 parts of chloranil-m-nitranilide (obtained by condensation of chloranil with m-nitraniline) are introduced into 250 parts of aqueous ammonium sulfide and the whole is heated for some hours to about 120° C. After cooling down the dark precipitate is filtered off and washed with water. The new dyestuff thus obtained dissolves in concentrated sulfuric acid with a violet blue color and forms with alkaline hydrosulfite a yellow colored vat from which wool is dyed full greyish brown shades.

The same starting material yields an intensely greenish brown dyestuff by heating one part of it with a solution of 6 parts of crystallized sodium sulfide in 20 parts of water and precipitating with acids the dyestuff formed after several hours' boiling.

The chloranil-m-nitranilide being replaced by the same quantities of the condensation products of chloranil and chlor-m-nitraniline ($Cl:NO_2:NH_2=1:2:4$), or nitrophenetidine ($OC_2H_5:NO_2:NH_2=1:2:4$) and being heated with an aqueous or alcoholic solution of ammonium sulfide similar dyestuffs are obtained dyeing wool from the vat brown respectively blackish brown shades.

Having now described our invention, what we claim is:

1. The process of manufacturing new vat dyestuffs by heating with alkaline sulfides the m-nitroarylides of the halogenated benzoquinones (obtained by condensation of the halogenated benzoquinones with m-nitroarylamines.)

2. The process of manufacturing a new vat dyestuff by heating with ammonium sulfide under pressure the chloranil-m-nitranilide (obtained by condensation of chloranil with m-nitraniline.

3. As new products the hereinbefore described new vat dyestuffs obtainable by heating with alkaline sulfides the m-nitroarylides of the halogenated benzoquinones (obtained by condensation of the halogenated benzoquinones with m-nitroarylamines), said dyestuffs being dark powders insoluble in water and in most organic solvents, soluble in concentrated sulfuric acid with a violet to a blue to a greenish blue color and dyeing wool from the vat shades varying from brown to greenish brown to blackish brown shades of great fastness and intensity.

4. As a new product the hereinbefore described new vat dyestuff produced by heating with ammonium sulfide under pressure the chloranil-m-nitranilide (obtained by condensation of chloranil with m-nitraniline), said dyestuff being a dark powder insoluble in water and most organic solvents, soluble in sulfuric acid with a violet blue color and dyeing wool from the vat full greyish brown shades of great fastness and intensity.

In witness whereof we have hereunto signed our names this 16 day of Aug. 1921, in the presence of two subscribing witnesses.

JULIUS SCHMIDLIN.
WALTER BRUNNER, Ph. D.

Witnesses to signature of Julius Schmidlin:

FRIDO KURZ,
WILLIAM E. HOLLAND.

Witnesses to signature of Walter Brunner:

JACOB CHIREÏGHOFER,
GUSTAV MUCARD.